United States Patent [19]
Sorensen

[11] Patent Number: 5,492,284
[45] Date of Patent: Feb. 20, 1996

[54] TAPE CARTRIDGE CONNECTOR LOCK

[75] Inventor: Steven W. Sorensen, Maplewood, Minn.

[73] Assignee: Minnesota Mining and Manufacturing Company, St. Paul, Minn.

[21] Appl. No.: 226,387

[22] Filed: Apr. 12, 1994

Related U.S. Application Data

[63] Continuation of Ser. No. 811,005, Dec. 20, 1991, abandoned.

[51] Int. Cl.⁶ .......................... G11B 23/107; B65H 75/28
[52] U.S. Cl. .................. 242/348.2; 242/336; 242/338.1; 360/132
[58] Field of Search ..................... 242/197, 195, 242/198, 199, 336, 338.1, 348.2, 338, 326.1; 360/132; 354/275; 352/78 R

[56] References Cited

U.S. PATENT DOCUMENTS

| | | | |
|---|---|---|---|
| 3,613,977 | 10/1971 | Egan | 242/348.2 X |
| 3,655,145 | 4/1972 | Olsen | 242/348.2 |
| 3,682,415 | 8/1972 | Ibuchi | 242/338.1 |
| 4,068,809 | 1/1978 | Koester | 242/338.1 |
| 4,432,508 | 2/1984 | Inoue et al. | 242/332.4 |
| 4,477,851 | 10/1984 | Dalziel et al. | 242/348.2 X |
| 4,555,077 | 11/1985 | Platter et al. | 242/338.1 |
| 4,572,460 | 2/1986 | Hertrich | 242/332.4 |
| 4,787,570 | 11/1988 | Nakagome | 242/332.8 |
| 4,920,436 | 4/1990 | Novak | 242/336 |
| 5,002,237 | 3/1991 | Hirayama | 242/345 |
| 5,031,065 | 7/1991 | Flor et al. | 242/336 |
| 5,072,325 | 12/1991 | Weeks et al. | 360/132 |
| 5,121,276 | 6/1992 | Weeks et al. | 242/336 |

*Primary Examiner*—John Q. Nguyen
*Attorney, Agent, or Firm*—Merchant, Gould, Smith, Edell, Welter & Schmidt

[57] ABSTRACT

A single reel supply cartridge is provided with a lock clip which restrains a tape connector within the mouth of the cartridge. The lock-clip is released by the insertion of a release pin in to the cartridge as the cartridge is inserted into a cartridge adaptor.

2 Claims, 3 Drawing Sheets

TAPE CARTRIDGE CONNECTOR LOCK

This is a continuation of application Ser. No. 07/811,005, filed Dec. 20, 1991, now abandoned.

BACKGROUND OF THE INVENTION

1. Field of the Invention

The present invention relates to a tape connector lock for use in a tape cartridge. The cartridge is used in a two-piece videocassette. One piece is a removable cartridge and the second piece is a complimentary videocassette adaptor. Together the two piece assembly emulates an industry standard videocassette.

2. Description of the Prior Art

It has become common to use magnetic recording media supplied in a cassette format for consumer videotape applications. The traditional cassette format includes both a supply reel and a take-up reel. The tape is wound on to the supply reel. One end of this tape is permanently attached to this supply reel and the other end of the tape is permanently attached to the take-up reel. In the cassette, the supply reel and the take-up reel share the same housing, and, in use the videotape machine transports the tape between the two reels. This packaging strategy is inefficient for tape storage due to the inclusion of an empty reel in the package.

It has been proposed to supply magnetic recording media in a more compact and space efficient cartridge format for a variety of applications. In the cartridge format, the housing contains a single supply reel for storing tape. The "free" end of the tape must be threaded or otherwise attached to a remote take-up reel.

Cartridge-to-cassette adaptors which convert a cartridge format product to a cassette format application are also known as evidenced by U.K. Patent Application No. 2,217,684 A to Davis for example. This reference teaches a videotape application of a single supply reel cartridge product.

Another example of a cartridge-to-cassette adaptors for videotape products is known from U.S. Pat. No. 4,920,436 to Novak. Novak teaches, inter alia, a carrier or adaptor which is used to adapt a videotape cartridge to an industry standard videocassette format. With respect to the cartridge-to-cassette adaptor context, Novak provides a spring loaded pair of jaws to restrain a tape connector within the cartridge. The spring force generated by these jaws must be overcome to withdraw tape from the cartridge. These jaws may not reposition the tape connector to a fixed position in the cartridge and do not prevent unintended forced removal of the tape connector from the cartridge.

SUMMARY OF THE INVENTION

The context for the present invention is a two-piece videocassette which comprises a removable videotape cartridge, and a complimentary adaptor. The insertion of the cartridge into the adaptor produces an assembly which emulates the industry standard T-120 VHS videotape cartridge.

In contrast to the prior art cartridge-to-cassette adaptors, the cartridge of the present invention contains a lock clip structure which traps and positively locks the tape connector within the cartridge. This lock clip is released by insertion of the cartridge into the complimentary adaptor. In use, a release pin enters the cartridge to retract the lock structure permitting essentially zero force removal of the tape connector from the cartridge.

BRIEF DESCRIPTION OF THE DRAWING

Throughout the drawing, identical reference numerals refer to identical structural elements, wherein.

DETAILED DESCRIPTION OF THE INVENTION

Figure 1:
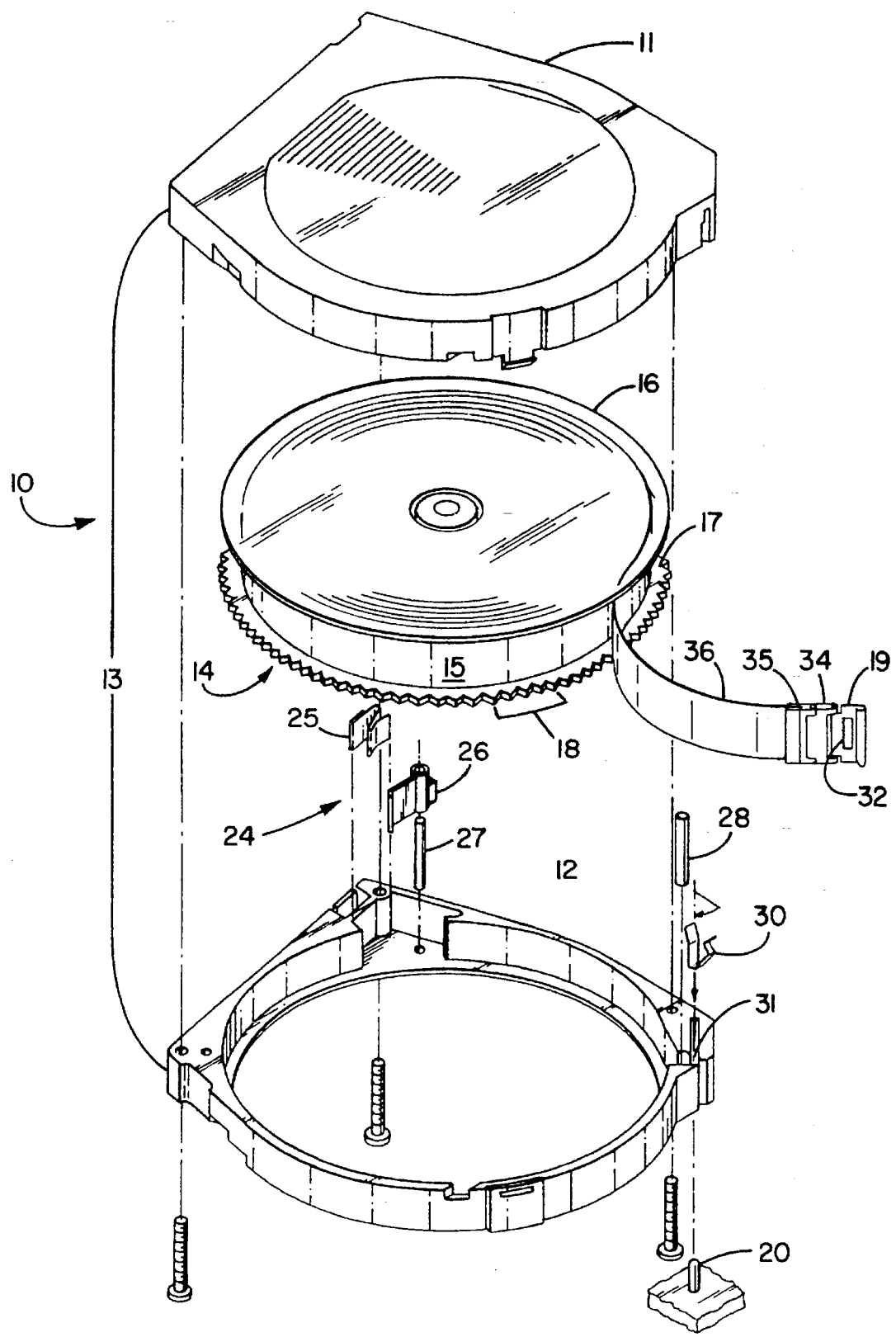
FIG. 1 is a an exploded view of the cartridge assembly.

FIG. 1 is an exploded view of the videotape cartridge 10 assembly. The cartridge housing is formed from an upper portion 11 and a lower portion 12 which mate to form a housing 13. The housing 13 locates the lock clip 30 in a lock clip cavity 31 formed in the lower portion 12 of the housing 13.

A tape supply reel 14 is provided within the housing 13 to store tape 15. This supply reel 14 is mounted for rotation within the housing 13. The preferred supply reel 14 includes an upper flange 16 and a lower flange 17. The lower flange 17 preferably has a plurality of gear-form teeth formed on its periphery forming a supply reel gear flange 18. These teeth are used to rotate the reel 14 in the complimentary adaptor according to the teachings of companion U.S. patent application Ser. No. 07/481,986 filed Feb. 20, 1991, now abandoned and U.S. patent application Ser. No. 07/398,069 filed Aug. 24, 1989, now U.S. Pat. No. 5,099,378 and U.S. Pat. No. 5,034,842 to Turgeon, all commonly assigned, which describe the use of the teeth during the winding function in greater detail and which are incorporated by reference herein.

These teeth also interact with the reel brake assembly 24 which includes a bias spring 25 which forces the ratchet arm 26 into engagement with the gear tooth flange 18. This assembly permits counterclockwise rotation of the reel 14 to take up slack tape 15 within the cartridge 10. The axle 27 locates the ratchet arm 26 within the cartridge 10 and aligns the cartridge upper and lower portions 11 and 12 when assembled. A guide pin 28 also serves to position and register the upper 11 and lower 12 portions of the housing 13.

In general terms, the insertion of the cartridge 10 into the adaptor "makes" a connection between a "tape connector" 19 carried in the cartridge and a "tether connector" 29 present in the adaptor. The preferred interconnection structures are more fully disclosed in companion commonly assigned U.S. patent application Ser. No. 07/690,638 filed Mar. 24, 1991, now U.S. Pat. No. 5,207,395 and incorporated herein by reference. This interconnection hardware (19 and 29) needs to be transported across the tape path defined in the adaptor and loaded onto the takeup reel prior to using the adaptor/cartridge combination in a videotape machine.

Figure 5:
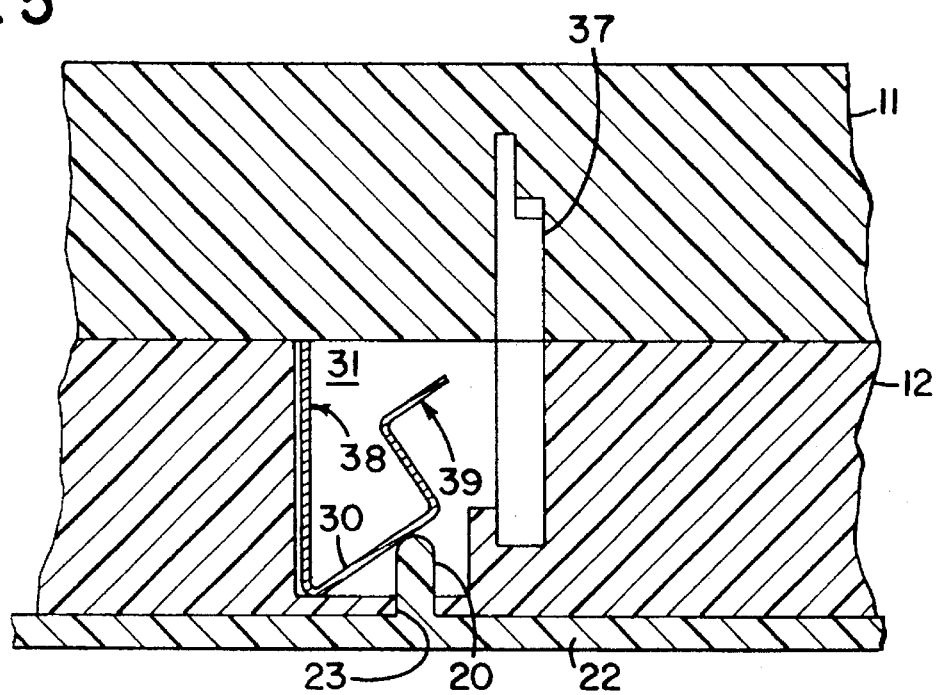
FIG. 5 is a detail view showing the lock clip in the lock clip cavity.

In use, the user loads a cartridge into the adaptor and elevates a winding key and turns it to move the interconnection hardware onto the take-up reel. This winding process requires that the tape connector 19 be free to move under the influence of the adaptor winding mechanisms. For purposes of this disclosure the only adaptor structure which interacts with the cartridge is a release pin shown schematically as 20 in FIG. 1, and is seen again in FIG. 5. This release pin 20 is anchored in the floor 21 of the adaptor 22 and enters the cartridge through a release aperture 23 formed in the lower portion 12 of the housing 13, during the cartridge insertion process. These structures are best seen in FIG. 5.

Figure 2:
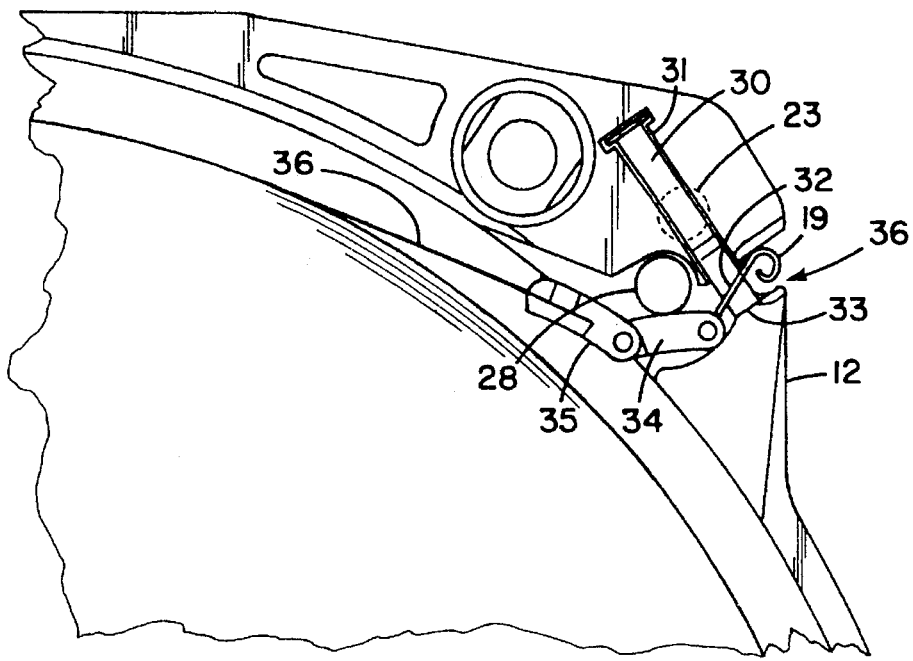
FIG. 2 is a detail view of the lock clip and related structures.
Figure 3:
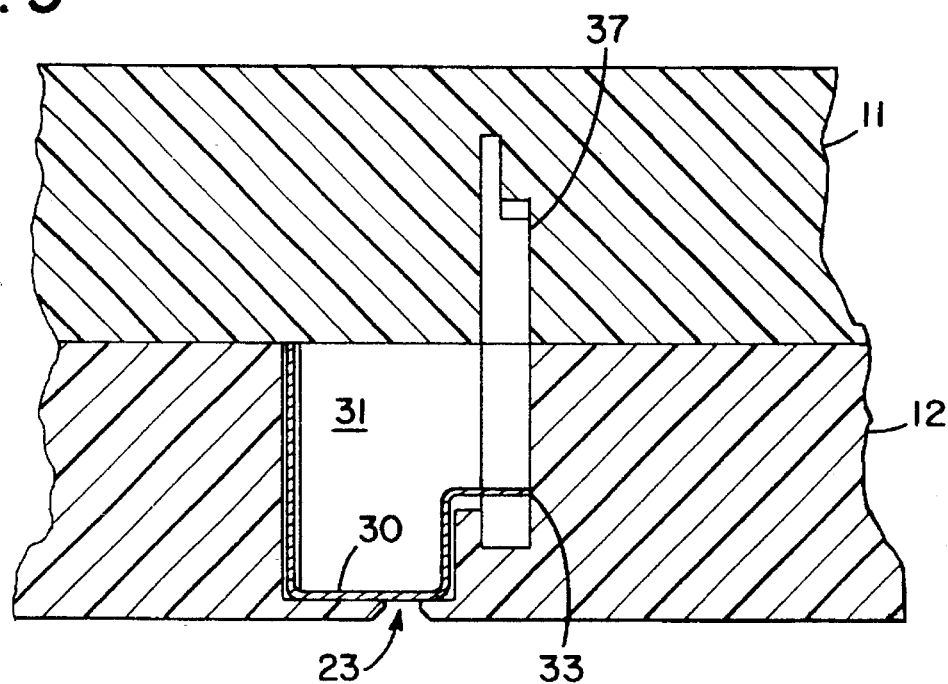
FIG. 3 is a detail view showing the lock clip in the lock clip cavity.

FIG. 2 and FIG. 3 should be considered together and they correspond to the lock clip 30 in the "locked" position.

FIG. 2 is a cross-section of the cartridge along the parting surfaces of the upper portion 11 and lower portion 12 of the housing 13. It is preferred to form the lock clip from a non-magnetic metallic spring material such as stainless steel alloy to ensure reliability, although other materials may be substituted without departing from the invention. This figure shows the lock clip 30 passing though a lock clip aperture 32 and resting against a surface 33 of the lower housing 12. This "through the connector" structure ensures that forces applied to the tape connector 19 while the cartridge is outside of the adaptor are carried entirely by the lock clip and essentially no strain is applied to the tape connector 19, link 34 or the tape link 35 or the tape leader 36, from outside the cartridge 10. It is also preferred to form the tape connector 19 from a non-magnetic metallic material to prevent magnetization of the connector structures and to prevent interference with information stored on the magnetic tape.

FIG. 3 is a complimentary view of the lock clip 30 taken at a right angle to the view of FIG. 2 along the plane of the lock clip cavity 31. In this figure the tape connector is not shown in the connector slot 37, to clarify the position of the lock clip 30 in the "locked" position, with the clip resting on surface 33 of the lower portion 12 of the housing 13.

Figure 4:
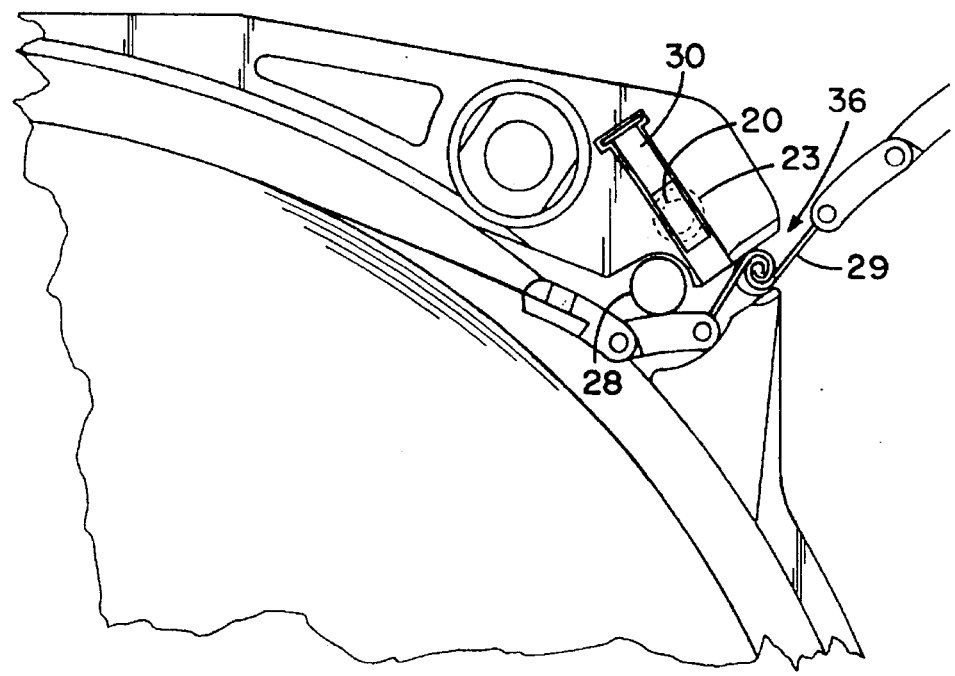
FIG. 4 is a detail view of the lock clip and related structures.

FIG. 4 and FIG. 5 should be considered together and correspond to the lock clip 30 in the "released" position.

FIG. 4 shows the release pin 20 engaged with the lock clip 30 which withdraws the lock clip from the lock clip aperture 32 formed in the tape connector 19. In this position the tape connector 19 can be withdrawn by the tether connector 29 and associated linkages.

FIG. 5 is a complimentary view of the lock clip 30 taken at a right angle to the view of FIG. 4 along the plane of the lock clip cavity 31. Here the lock clip is shown in a loaded position with the lock clip 30 forced into a cantilevered position by the force supplied by the release pin 20. As seen in this figure the spring force generated by the lock clip retains the clip in contact with the nose of the pin 20. It is also important to note that the lock clip 30 is completely withdrawn from the connector slot 37 which prevents damage to the tape. The preferred form of the lock clip includes a substantially U-shaped spring member 39 coupled to a tab portion 38. In general the U-shaped spring member 39 is deflected by entry of the release pin through the release pin aperture 23. In general the tab portion 38 is deflected slightly as it rests against cartridge surface 33. It should be apparent that various modifications to the preferred structures described may be made without departing from the scope of the invention.

What is claimed is:

1. A removable tape cartridge for insertion into a cartridge-to-cassette adaptor of the type utilized to emulate videocassettes, said removable tape cartridge comprising:

a cartridge housing, having an interior;

a tape supply reel located within said interior of said cartridge housing, for storing tape;

tape wound onto and attached at one end to said tape supply reel, said tape having a free end;

a tape connector connected to said free end of said tape and positioned in a connector slot formed in said housing, said tape connector having a lock clip aperture formed therein, a lock clip cavity formed in said cartridge housing proximate said connector slot to receive and locate a lock clip;

said lock clip located within said lock clip cavity proximate said lock clip aperture;

said lock clip comprising a substantially U-shaped spring member coupled to a tab portion resting against a surface of the cavity, one end of said U-shaped spring member having a portion protruding through said lock clip aperture of said tape connector positioned in said connector slot thereby defining a locked position for restraining said tape connector;

the bottom surface of the "U" of said U-shaped spring member defining a release surface such that when said cartridge is inserted into said adaptor, a release pin associated with said adaptor presses against said release surface to deflect the U-shaped spring member to withdraw the protruding portion of said lock clip from said lock clip aperture, thereby defining a released position for unrestrained motion of said tape connector out of said housing.

2. The cartridge of claim 1, further comprising:

a release pin aperture located in said housing proximate said lock clip cavity such that said release pin located on the cartridge-to-cassette adaptor may enter said lock clip cavity through said release pin aperture to press against said release surface and deflect said U-shaped spring member therefore withdrawing said protruding portion of said lock clip from said lock clip aperture defining said released position.

* * * * *

UNITED STATES PATENT AND TRADEMARK OFFICE
CERTIFICATE OF CORRECTION

PATENT NO. : 5,492,284

DATED : February 20, 1996

INVENTOR(S) : Sorensen

It is certified that error appears in the above-identified patent and that said Letters Patent is hereby corrected as shown below:

Col. 1, line 12 "complimentary" should read --complementary--

Col. 1, line 58 "complimentary" should read --complementary--

Col. 1, line 66 "complimentary" should read --complementary--

Col. 2, line 33 "complimentary" should read --complementary--

Col. 3, line 29 "complimentary" should read --complementary--

Col. 3, line 43 "complimentary" should read --complementary--

Signed and Sealed this

Twenty-sixth Day of November 1996

Attest:

BRUCE LEHMAN

Attesting Officer

Commissioner of Patents and Trademarks